F. W. DOWNING.
SOLDERING IMPLEMENT.
APPLICATION FILED APR. 25, 1910.

981,396.

Patented Jan. 10, 1911.

Witnesses:

Inventor:
Frank W. Downing
by Harry R. Williams
Atty.

UNITED STATES PATENT OFFICE.

FRANK W. DOWNING, OF ESSEX, CONNECTICUT.

SOLDERING IMPLEMENT.

981,396.  Specification of Letters Patent.  Patented Jan. 10, 1911.

Application filed April 25, 1910. Serial No. 557,429.

*To all whom it may concern:*

Be it known that I, FRANK W. DOWNING, a citizen of the United States, residing at Essex, in the county of Middlesex and State of Connecticut, have invented a new and useful Improvement in Soldering Implements, of which the following is a specification.

This invention relates to those implements which are commonly known as soldering irons or tools. These tools ordinarily have a bit, formed of a mass of copper, and an iron stem with a wooden handle, and are used for the purpose of melting and running solder upon metal.

The object of this invention is to provide an implement of this nature with a bit having a reservoir which may be packed with solder, and a valve controlled passage leading from the reservoir to the end, near the point of the bit, whereby when the solder is melted in the reservoir it can be easily applied in the quantity required, to the exact locality on the surface of the part to be soldered.

Figure 1:
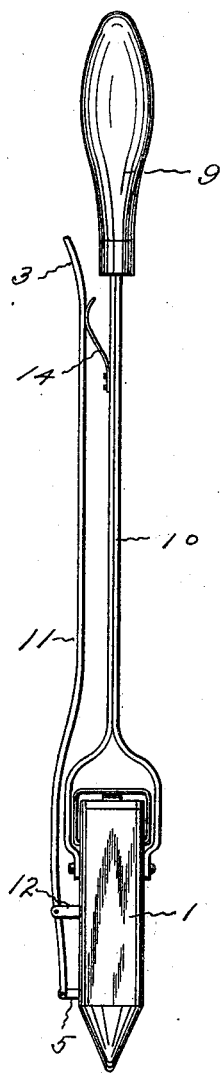
Figure 2:
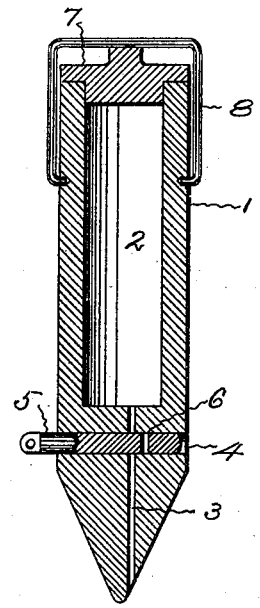

Figure 1 of the accompanying drawings shows a side view, on a reduced scale, of an implement which embodies this invention. Fig. 2 shows a longitudinal section, on a larger scale, of the bit.

The bit 1, is as usual, formed of a block of copper with a point at one end. A chamber 2 is formed in the other end, by drilling or otherwise, to provide the reservoir. A small passage 3 is made from the inner end of the reservoir to the tapering end at one side of the point of the bit. An opening 4 is drilled or bored transversely of the bit back of the tapering end so as to cross the passage from the reservoir to the point. In this opening, which is desirably circular in cross section, is a pin 5. This pin has a hole 6, which when the pin is in one position, will coincide with the passage from the reservoir to the point. A cap 7 is provided for closing the open end of the reservoir. This cap is desirably held in place by a swinging bail 8.

A common wooden handle 9 is shown as connected with the bit by rods 10, which are fastened to the bit in any desired manner. The rods are separated and span the end of the bit, so as to permit the easy removal of the cap and free access to the reservoir. A lever 11 is shown as pivoted to a lug or post 12 that extends from one side of the bit. One end of this lever is connected with the valve pin while the other end extends to the vicinity of the handle and is desirably shaped to provide a thumb piece 13. A spring 14 is arranged between the handle rods and the thumb piece end of the lever for the purpose of normally holding that end of the lever out.

Solder is put into the reservoir and the cap is placed in position and fastened by the bail. The spring normally holds the valve pin lever in such manner that the valve pin closes the passage from the end of the reservoir to the point of the bit. When the copper is sufficiently heated and the solder it contains is melted, and it is desired to use the implement, it is held in one hand with the thumb on the end of the lever. Pressing on this end of the lever with the thumb moves the pin, which forms the valve, and opens the passage, allowing melted solder to flow from the reservoir to the point of the bit. Just the desired amount of solder can be applied with this implement, which is held and manipulated with one hand so as to leave the other hand free for holding the article or pieces to which the solder is to be applied, or for any other purpose.

The invention claimed is:

A soldering implement having a bit with a point at one end and a chamber that opens at the end opposite to the point, said bit having a passage extending from the chamber to the exterior near the point and an opening extending transversely across the bit and cutting said passage, a perforated pin movable in said transverse opening, a cap at the end of the bit for closing the end of the chamber, a swinging bail for holding the cap in position, rods extending from the sides of the bit, a handle at the end of the rods, and a lever with one end connected with the pin and the other end located adjacent to said handle.

FRANK W. DOWNING.

Witnesses:
H. R. WILLIAMS,
JOSEPHINE M. STREMPFER.